(12) United States Patent
Garcia-Gavito Morillas

(10) Patent No.: US 9,000,951 B2
(45) Date of Patent: Apr. 7, 2015

(54) AERONAUTICAL SAFETY DEVICE

(76) Inventor: Ramon Garcia-Gavito Morillas, Madrid (ES)

( * ) Notice: Subject to any disclaimer, the term of this patent is extended or adjusted under 35 U.S.C. 154(b) by 0 days.

(21) Appl. No.: 13/992,609

(22) PCT Filed: Jan. 30, 2012

(86) PCT No.: PCT/ES2012/070046
§ 371 (c)(1),
(2), (4) Date: Jun. 7, 2013

(87) PCT Pub. No.: WO2012/107613
PCT Pub. Date: Aug. 16, 2012

(65) Prior Publication Data
US 2014/0132428 A1 May 15, 2014

(30) Foreign Application Priority Data

Feb. 11, 2011 (ES) .............................. 201130136 U

(51) Int. Cl.
*G08B 21/00* (2006.01)
*B64D 45/00* (2006.01)
*B64D 43/00* (2006.01)

(52) U.S. Cl.
CPC ................ *B64D 45/00* (2013.01); *B64D 43/00* (2013.01)

(58) Field of Classification Search
USPC ......... 340/959, 945, 947, 952, 953, 961, 963, 340/970, 951, 950, 971, 980, 974, 981, 946
See application file for complete search history.

(56) References Cited

U.S. PATENT DOCUMENTS

| 5,108,049 | A | * | 4/1992 | Zinovi | 244/172.1 |
| 5,548,517 | A | * | 8/1996 | Nance | 701/124 |
| 6,313,759 | B1 | | 11/2001 | Musland-Sipper | |
| 8,032,267 | B1 | * | 10/2011 | Simon | 701/4 |
| 2003/0112130 | A1 | | 6/2003 | Templeman | |
| 2003/0132859 | A1 | * | 7/2003 | Bissett | 340/945 |
| 2004/0027256 | A1 | * | 2/2004 | Lane | 340/945 |
| 2005/0216138 | A1 | * | 9/2005 | Turung | 701/3 |
| 2009/0089693 | A1 | | 4/2009 | Fahy | |
| 2012/0217339 | A1 | * | 8/2012 | Gilleran et al. | 244/50 |

* cited by examiner

*Primary Examiner* — Daniel Previl
(74) *Attorney, Agent, or Firm* — Porzio, Bromberg & Newman, P.C.

(57) ABSTRACT

An aeronautical safety device which seeks to improve landing and take-off operations of aircraft, having a simple device which, by means of light means and push buttons or actuators indicating the instructions received, allow reflecting the instructions received from the control tower on a panel or in any other enabled point or by the senior cabin crew members themselves. The device has a casing on which at least two display indicators are arranged. One of them would serve for indicating that permission for takeoff or landing has been received, while the other light indicator would exclusively serve to indicate that the cabin is secure. The display indicators indicating that the instruction to initiate takeoff or landing has been received can range from light indicators to simple hinged flaps.

4 Claims, 1 Drawing Sheet

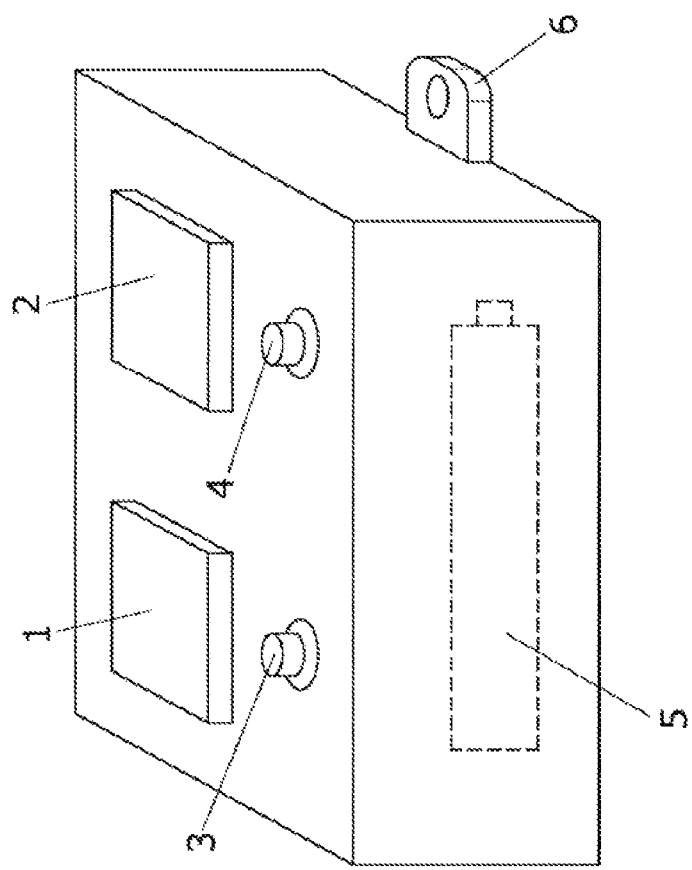

AERONAUTICAL SAFETY DEVICE

OBJECT OF THE INVENTION

An aeronautical safety device which seeks to improve landing and take-off operations of aircraft is the object of the present invention, as the title of the invention establishes, having the necessary means so that orders received from the control tower are properly indicated.

The present invention is characterized by the safety achieved in landing and take-off operations achieved with a simple device which, by means of light means and push buttons or actuators indicating the instructions received, allow reflecting the instructions received from the control tower on a panel or in any other enabled point or by the senior cabin crew members themselves.

The present invention is therefore confined within the aeronautical environment and more particularly within navigation safety.

BACKGROUND OF THE INVENTION

Up until now, take off and landing operations have been actions which are started by the aircraft commander once authorisation is received from the control tower.

Specifically, before aircraft takes off, at least these two necessary simultaneous events in particular must occur, on one hand, the oral confirmation given by the senior cabin crew member reporting that the cabin is secure, and on the other hand, verbal authorisation received from the control tower that take off can take place.

To be able to initiate landing manoeuvres, the commander must receive the authorisation from the control tower allowing the approach and subsequent landing actions.

The fact that the authorisations are verbal is occasionally a source of errors which can have definitive consequences because due to pressure, lack of concentration, said orders may or may not have been properly processed by the commander.

An object of the present invention is to therefore overcome the possible errors which could result from the verbal transmission of an instruction or authorisation received from the control tower for proceeding to take off or landing, developing a device improving the safety of said operations, where the device has the essential features included in claim 1.

DESCRIPTION OF THE INVENTION

The object of the invention is an aeronautical safety device reinforcing the safety in the take off and landing actions.

The device has a casing on which at least two display indicators are arranged. One of them would serve for indicating that permission for take off or landing has been received, while the other light indicator would exclusively serve to indicate that the cabin is secure.

The display indicators indicating that the instruction to initiate take off or landing has been received can range from light indicators to simple hinged flaps.

Additionally, in the case of using light indicators each of the indicators would be associated to operating means for operating said light indicator, which could range from a push button to a toggle switch or any other known operating means.

In order to fix the device on any surface, such device can have fixing means which can range from adhesive means to small loop linking means with curved stakes at their ends, or even screwing means.

To provide the device with certain autonomy, the inside of the casing of the device has a housing for arranging a battery for powering the light indicators.

Additionally, and so as to not keep the light indicators on, the device can have a timer so that the lights are switched off after a time has elapsed.

The light indicators can be returned to an off position by pressing the push buttons again or by operating the switches moving them to an off position.

As a result of the described device, air navigation safety is increased, particularly in take off and landing operations, not leaving it to the commander's memory to know if the instructions authorizing the commencement of take off or landing manoeuvres have been received, being able to leave the received instructions permanently indicated on a panel, resulting in a clear safety advantage.

DESCRIPTION OF THE DRAWINGS

To complement the description that will be given below and for the purpose of aiding to better understand the features thereof, a set of drawings it attached to the present specification in which the figures thereof depict the most significant details of the invention in an illustrative and non-limiting manner.

FIG. 1 shows a perspective view of the safety device object of the invention where the main elements forming part of the device can be seen.

PREFERRED EMBODIMENT OF THE INVENTION

A preferred embodiment of the proposed invention is described below in light of the drawings.

FIG. 1 shows that the device basically has a casing of any shape or geometry, preferably parallelepiped, with a lower fixing surface and an upper surface or display panel.

The presence of a first light indicator (1) can be seen on the upper face, which indicator can have written text referring to the received authorisation, such as for example "clear to land/take off". They additionally have a second light indicator (2) designed for the cabin situation which, as in the previous case, can have a screen printed text such as for example "cabin ready".

There is a first light indicator operating/repositioning means associated with the first light indicator (1) which is a push button (3) in the depicted figure, being able to be any other known means such as switches or the like.

There is a second light indicator operating/repositioning means associated with this second light indicator (2) which is a push button (4) in the depicted figure, being able to be any other known means such as switches or the like.

Arranged inside the casing there is a battery (5) for powering the light indicators (1) and (2) and for being able to be autonomous with respect to the remaining aircraft equipment.

The depicted figure also shows a lug (6) which is simply a fixing means for the fixing thereof on any surface, being able to use known means such as adhesives, fixing flaps, etc.

Variations in materials, shape, size and arrangement of the component elements described in a non-limiting manner do not alter the essence of this invention, such non-limiting description being sufficient for a person skilled in the art to reproduce the invention.

The invention claimed is:

1. An aeronautical safety device, comprising a casing; a first light indicator on the upper face of said casing indicating landing or take off permission having written the text "clear to land/take off"; a second light indicator on the upper face of said casing to indicate if the cabin is ready having written the text "cabin ready"; a first light indicator operating/repositioning means associated with the first light indicator, a second light indicator operating/repositioning means associated with the second light indicator, and a battery inside the casing for powering the first light indicator and the second light indicator and for being able to be autonomous with respect to the remaining aircraft equipment.

2. The aeronautical safety device according to claim 1, wherein the first and second light indicator operating/repositioning means are push buttons.

3. The aeronautical safety device according to claim 1, wherein the first and second light indicator operating/repositioning means are switches.

4. The aeronautical safety device according to claim 1, wherein the casing has fixing means such as adhesives or lugs for fixing with screws, or fixing flaps.

* * * * *